INVENTOR.
PIERRE J. BACQUE,
BY
McMorrow, Berman & Davidson
ATTORNEYS.

July 14, 1964 P. J. BACQUE 3,140,649
HEATED AND MOISTURIZED MEAT CONTAINER FOR SLICERS
Filed March 30, 1962 3 Sheets-Sheet 2
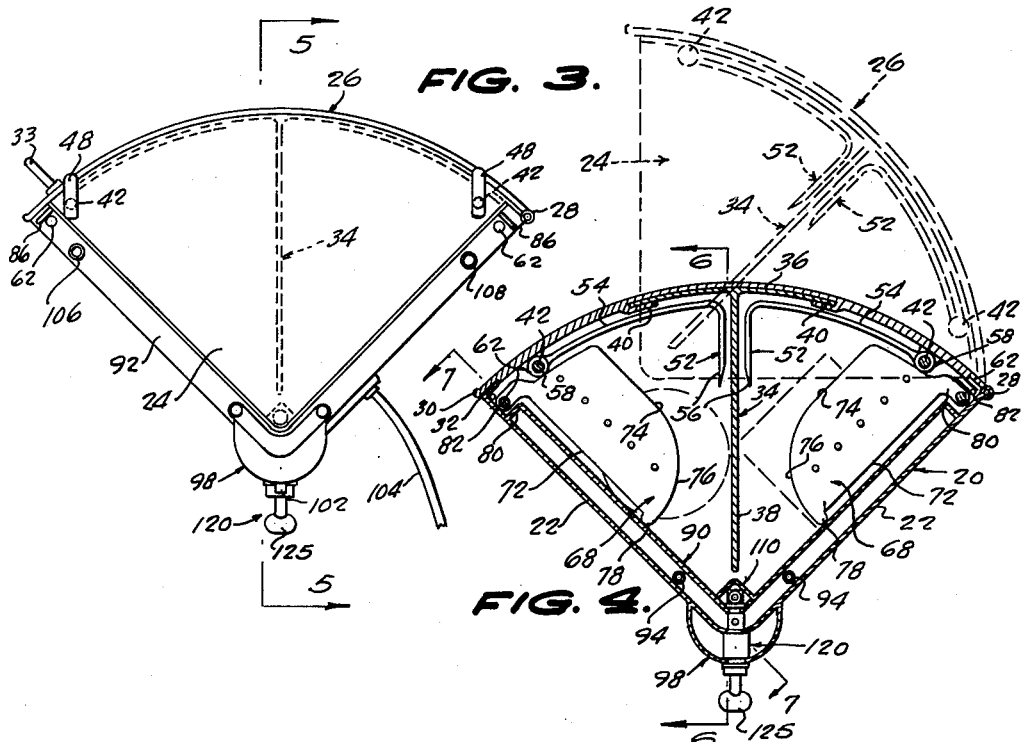
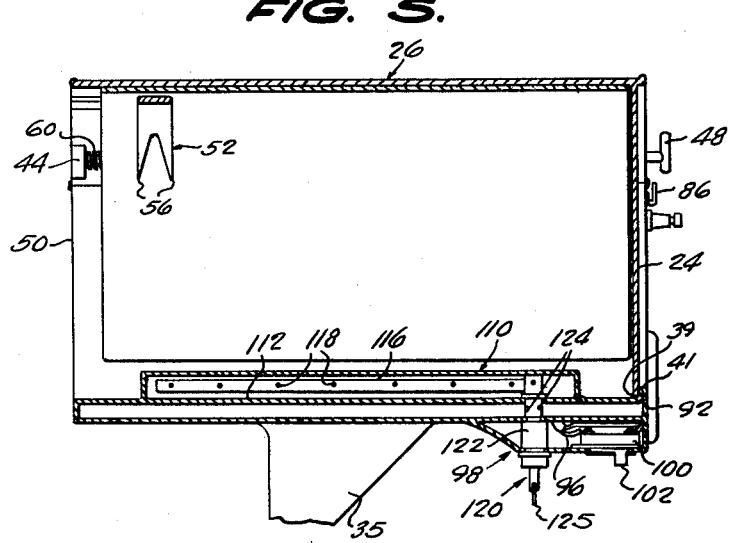
INVENTOR.
PIERRE J. BACQUE,
BY
McMorrow, Berman + Davidson
ATTORNEYS.

July 14, 1964 P. J. BACQUE 3,140,649
HEATED AND MOISTURIZED MEAT CONTAINER FOR SLICERS
Filed March 30, 1962 3 Sheets-Sheet 3
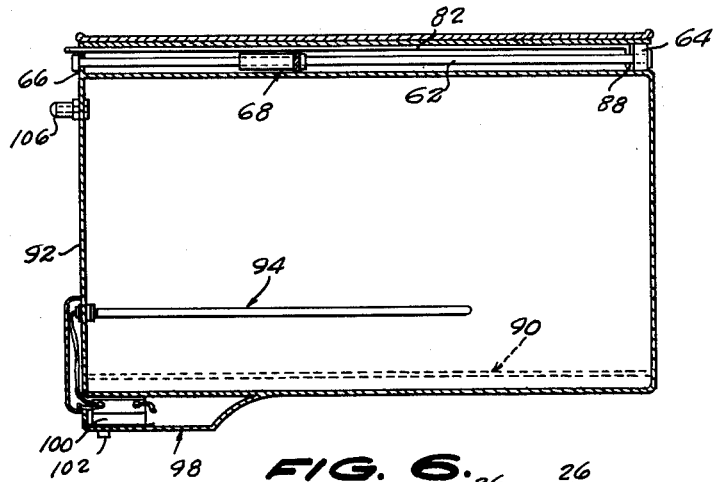
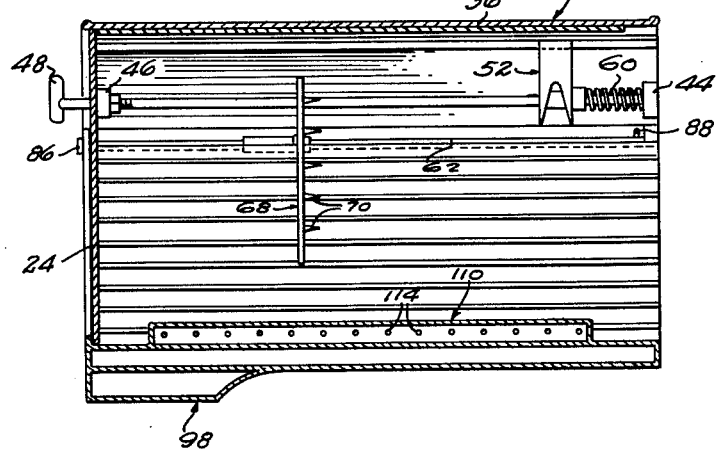
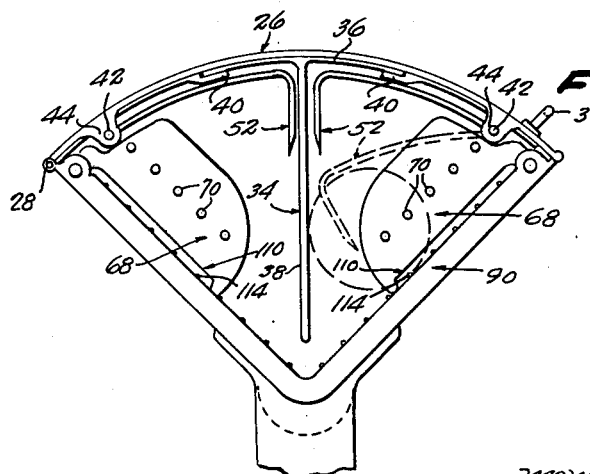
INVENTOR.
PIERRE J. BACQUE,
BY
McMorrow, Berman + Davidson
ATTORNEYS.

United States Patent Office 3,140,649
Patented July 14, 1964

3,140,649
HEATED AND MOISTURIZED MEAT CONTAINER
FOR SLICERS
Pierre J. Bacque, 13800 S. Biscayne River Drive,
Miami 61, Fla.
Filed Mar. 30, 1962, Ser. No. 183,916
15 Claims. (Cl. 99—234)

This invention relates to improvements in meat holding and feeding devices for slicing machines, and more particularly to a novel device of this kind in the form of an accessory for slicers, having a closed and heated housing for containing meats in a warm and moist condition and for feeding meats gravitationally and selectively to the gauge plates and knives of slicing machines.

The primary object of the invention is the provision of an efficient accessory of the kind indicated above, for mounting upon the gauge plate of a meat slicer, which reduces expenses by eliminating the manual and often unsanitary handling of meats, ordinarily unavoidable in the use and operation of slicers, which result in damage to and loss of meat, while maintaining the meat in a warm and tasteful condition, as for making hot sandwiches.

Another object of the invention is the provision of an accessory of the character indicated above, which has, within its housing and accessible from outside of its housing, manually operated means for arresting the downward movement, toward the gauge plate and cutter of a slicer, of either one of two pieces of meat, or of both pieces, the two pieces being separated by a partition in the housing, whereby any number of slices may be selectively cut from one piece at a time or from both pieces at one time, and the entirety of either or both pieces of meat sliced, without wastage of any portion thereof.

A further object of the invention is the provision, in an accessory of the character indicated above, of manual meat feeding means, within the housing and accessible from the exterior of the housing, for moving meats downwardly in the housing, toward the slicer gauge plate and knife, in case of lodgment of the meats in the housing.

A still further object of the invention is the provision of an accessory of the character indicated above, whose housing has preferably electrical heating means and a perforated steam jacket for supplying steam to the interior of the housing for moisturizing and maintaining the heat of meat in the housing, the jacket being adapted to be supplied with steam from an outside source or by the boiling of water thereon by the heating means.

Other important objects and advantageous features of the invention will be apparent from the following description and the accompanying drawings, wherein, for purposes of illustration only, a specific form of the invention is set forth in detail.

In the drawings:

FIGURE 3 is a horizontal section taken on the line 3—3 of FIGURE 2;

FIGURE 4 is a horizontal section taken on the line 4—4 of FIGURE 2, showing the door of the housing in closed position, in full lines, and in open position, in phantom lines;

FIGURE 5 is a vertical section taken on the line 5—5 of FIGURE 3;

FIGURE 6 is a vertical section taken on the line 6—6 of FIGURE 4;

FIGURE 7 is a vertical section taken on the line 7—7 of FIGURE 4; and,

FIGURE 8 is a bottom plan view of FIGURE 3.

Figure 1:
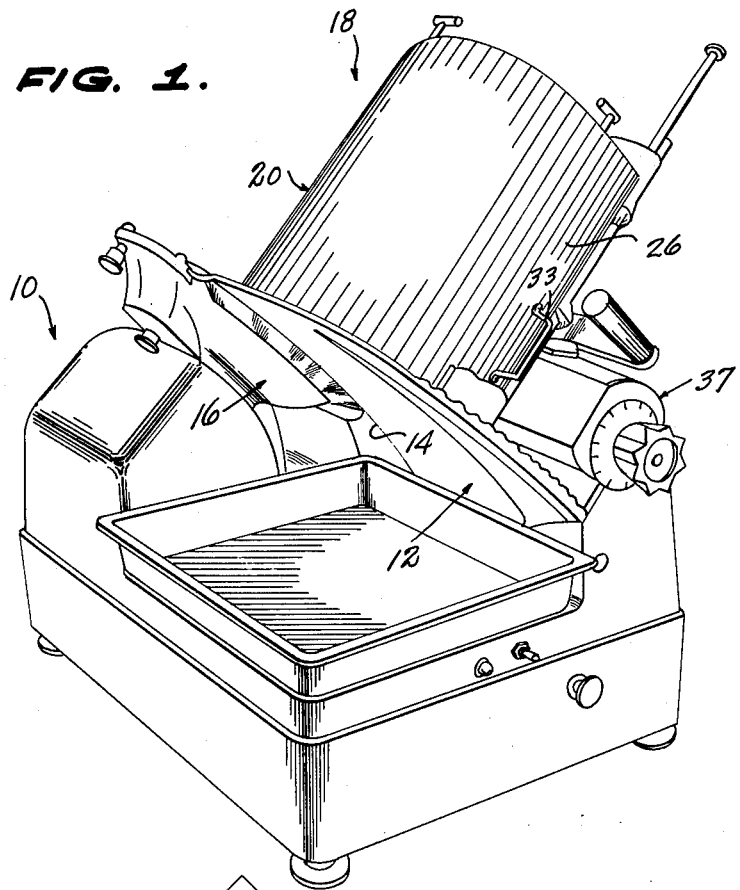
FIGURE 1 is a perspective view of a meat slicer equipped with an accessory in accordance with the present invention, in place of the usual meat holding means.
Figure 2:
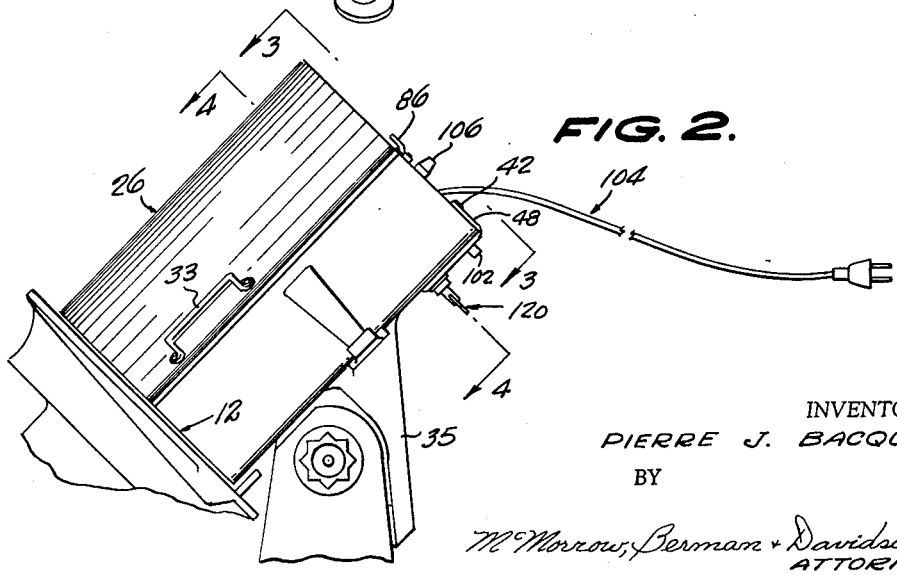
FIGURE 2 is a fragmentary right-hand elevation of FIGURE 1.

Referring in detail to the drawings, wherein like numerals designate like parts throughout the several views, the numeral 10 generally designates a conventional meat slicer having a rearwardly angled fixed flat gauge plate 12 having a curved shearing edge 14, from which is spaced a fixed knife 16 having an arcuate, downwardly beveled cutting edge 17. In accordance with the present invention, the usual meat holding means (not shown) is removed from the gauge plate and is replaced by an accessory, generally designated 18.

The accessory 18 comprises a vertical, open-bottom housing 20, which is segmental in horizontal cross section, has forwardly divergent side walls 22, an imperforate segmental top wall 24, and a front opening, extending between the forward edges of the side walls and the top wall, which is normally closed by an arcuate door 26. The door 26 is hinged, as indicated at 28, to the forward edge of one side wall 22, and has a free end 30, which bears against an internal flange 32 on the forward edge of the other side wall, in the closed portion of the cover, as shown in full lines in FIGURE 4. An external handle 33 is provided on the door adjacent to its free edge.

The housing 20 is supported with its lower end parallel to and slightly spaced above the upper surface of the gauge plate 12, by means of a vertical bracket 35, which is suitably fixed to the horizontally reciprocable component 37 of the slicer 10. The segmental top wall 24 is fixed to the upper edge of the door 26, and moves forwardly out of contact with the sidewalls 22, when the door 26 is opened. The free side edges 39 of the top wall 24 engage under seals 41 on the sidewalls 22 which prevent steam from rising between the edges of the top wall and the housing side walls when the top wall is in its normal position, with the door 26 closed.

A removable vertical partition 34 is mounted centrally and radially on the door 26 and extends rearwardly therefrom across the interior of the housing 20, which serves to divide the interior thereof into two meat accommodating compartments, in which meats of differing kinds are adapted to be placed and isolated from each other. The partition 34 comprises an arcuate, vertically elongated plate 36, conforming in contour to and engaged with the rear side of the door 26, and a vertically elongated flat partition wall 38 extending rearwardly from the plate 36. The side edges of the plate 36 are, as shown in FIGURE 3, slidably confined in slideways 40 on the back of the door 26. The partition 34 is removable and replaceable only with the door 26 in its open position, and is adapted to be removed from the door when the housing 20 is to be occupied only by a single relatively large piece of meat.

Vertical rods 42, located near and paralleling the side edges of the door 26, are journalled in vertically spaced lower and upper lugs 44 and 46, respectively, the lower lugs 44 being on the back of the door 26, and the upper lugs 46 on part of the top wall 24 of the housing 20, the rods 42 being provided, above the top wall 24, with helical handles 48. Fixed on the lower part of the rods 42 and spaced upwardly from the open lower end 50 of the housing 20, as shown in FIGURE 6, are normally laterally inwardly extending L-shaped meat holding hooks 52. The hooks 52 comprise flat shanks 54 which terminate, at their inward ends, in inwardly directed points 56, which are normally positioned close to and spaced from the opposite sides of the partition wall 38. The outer ends of the hook shanks 54 are affixed to cylindrical bushings 58, circumposed on the rods 42, and coil springs 60 are circumposed on the rods and are compressed between the lower lugs 44 and the bushings 58, so that, when the handles 48 are pushed down and rotated, in direction to engage the hook points 56 with meats, and then released, the springs 60 serve to frictionally retain the hooks in meat holding positions, above and out of contact with the gauge plate 12 and knife 16 of the slicer 10.

Stationary vertical rods 62 extend between and are supported on lower and upper lugs 64 and 66, respectively, as shown in FIGURE 7, extending inwardly from the housing side walls 22, adjacent to their forward edges, and at the upper and lower ends of the housing 20, and carry vertically slidable flat meat feeding plates 68, having downwardly extending, evenly distributed meat engaging pins 70. The plates 68, as shown in FIGURES 4 and 8, have straight outer side edges 72, which parallel the housing side walls, and inner side edges, composed of straight forward portions 74 and convexly curved rear portions 76. Where the curved edge portions 76 meet the outer side edges 72, the plates 68 have outwardly extending ears 78, which bear against the housing side walls 22, and space the plates therefrom, as shown in FIGURE 4. At the forward ends of the outer side edges 72 are laterally outwardly extending arms 80, through which the rods 62 are fixedly engaged.

Vertical operating rods 82 for rotating and elevating and depressing the meat feeding plates 68 are located forwardly of the feeding plate arms 80, adjacent to the forward edges of the housing side walls 22, and are supported, at their upper ends, through the top wall 92 of a steam jacket 90, hereinafter described, and lugs 64, and have lateral handles 86, on their upper ends, positioned above the housing jacket wall 92. On their lower ends, the operating rods 82 have lateral arms 88, adapted to bear against the undersides of the feeding plates 68, when the rods 82 are elevated, for elevating the plates 68. Meats having been installed in the housing 20, at the opposite sides of the partition wall 38, with the door 26 in open position, beneath the feeding plates 68, the feeding plates 68 are adapted to be depressed and engaged with the tops of the meats, in the event that the meats become lodged in the housing, by manually pushing the feeding plates downwardly, while the door 26 is open.

Means for heating and moisturizing meats present within the housing comprises an internal water and steam jacket 90, which extends along the inner sides of the side walls 22 of the housing 20, as shown in FIGURES 4 and 5, through whose top wall 92 vertically elongated electrical heating elements 94 extend downwardly, at locations adjacent to opposite sides of the intersection of the housing end walls. Wires 96 lead from the heating elements 94 through the side walls 22, into a hollow semi-cylindrical casing 98, secured to the outer sides of the side walls 22 and enclosing the intersection thereof, to a switch 100, mounted therein, and having an external actuating member 102. An external power cord 104 leads from the switch 100. Water is adapted to be introduced into the jacket 90, through a plug 106 in its top wall 92. A safety pressure relief valve 108 also extends through the top wall 92.

A vertically elongated tubular shield 110 is mounted on the inner wall 112 of the steam jacket 90, at the apex thereof, whose side wall is perforated, as indicated at 114, and a tubular steam manifold 116, concentrically spaced from the shield 110, extends substantially the length thereof, and is provided therealong with perforations 118. The manifold 116 extends downwardly from and in communication with the inward end of a steam cut-off valve 120, whose casing 122, is mounted through the intersection of the housing side walls and the apex of the inner wall 112 of the jacket 90, and has holes 124 opening to the interior of the jacket 90, as shown in FIGURE 5. An external handle 125 on the valve casing 122 is rotatable to rotate a valve core (not shown) in the casing for opening and closing the holes 124, for respectively connecting and disconnecting the steam manifold 116 from the jacket 90, when desired. Where an outside source of steam is available, water is not introduced into the jacket 90, to be vaporized therein by the heating elements 94. Instead, such outside source can be connected, by means of a suitable fitting (not shown) to supply steam to the jacket 90.

In operation, it will be seen that meats placed in the housing 20 are adapted to subside thereon, of their own weight, and rest upon the gauge plate 12 and the knife 16 of the slicer 10, so that the lower ends of the meats can be sliced, simply by operating the slicer. Selection of which meat piece is to be sliced is done simply by disengaging the related hook 52 from the selected meat and engaging the other hook 52 with the meat not to be sliced, by depressing and rotating the rods 42, as hereinabove described. As this operation is performed by depressing and rotating the rod 42 related to the retained piece of meat, so as to engage the related hook 52 therewith, against the resistance of its spring 60, release of the rod 42 enables the spring 60 to expand and elevate the retained meat off the gauge plate and knife of the slicer, so that it will not be sliced, and the other piece of meat will be sliced, by operation of the slicer.

When a single large piece of meat is to be introduced into the housing 20, and sliced, the partition 34 is removed, in which case both of the feeding plates 68 are available for pressing the single large piece of meat, when necessary.

Although there has been shown and described a preferred form of the invention, it is to be understood that the invention is not necessarily confined thereto, and that any change or changes in the structure of and in the relative arrangements of components thereof are contemplated as being within the scope of the invention as defined by the claims appended hereto.

What is claimed is:

1. In combination, a mechanical meat slicer comprising a frame having thereon a gauge plate having an edge and a knife having a cutting edge spaced from the gauge plate edge, an open bottom imperforate walled housing supported on the frame over the gauge plate and the knife and opening to the space between the gauge plate edge and the cutting edge of the knife, means closing the top of the housing, said housing having a steam jacket extending partially therearound and having communication with the interior of the housing.

2. In combination, a mechanical meat slicer comprising a frame having thereon a gauge plate having an edge and a knife having a cutting edge spaced from the gauge plate edge, an open bottom imperforate walled housing supported on the frame over the gauge plate and the knife and opening to the space between the gauge plate edge and the cutting edge of the knife, means closing the top of the housing, said housing having a steam jacket extending partially therearound and having communication with the interior of the housing, and electrical heating means supported within the water jacket.

3. In combination, a mechanical meat slicer comprising a frame having thereon a gauge plate having an edge and a knife having a cutting edge spaced from the gauge plate edge, an open bottom imperforate walled housing supported on the frame over the gauge plate and the knife and opening to the space between the gauge plate edge and the cutting edge of the knife, means closing the top of the housing, said housing having a steam jacket extending partially therearound and having communication with the interior of the housing, said housing having an open front, a hinged door closing said front, and a vertical partition wall carried by the door and dividing the interior of the housing into two meat receiving chambers.

4. In combination, a mechanical meat slicer comprising a frame having thereon a gauge plate having an edge and a knife having a cutting edge spaced from the gauge plate edge, an open bottom imperforate walled housing supported on the frame over the gauge plate and the knife and opening to the space between the gauge plate edge and the cutting edge of the knife, means closing the top of the housing, said housing having a steam jacket extending partially therearound and having communication with the interior of the housing, said housing having an open front, a hinged door closing said front, and a vertical partition wall carried by the door and dividing the interior of the housing into two meat receiving chambers, and meat handling means in said chambers having handle means accessible outside of the housing.

5. In combination, a mechanical meat slicer comprising a frame having thereon a gauge plate having an edge and a knife having a cutting edge spaced from the gauge plate edge, an open bottom imperforate walled housing supported on the frame over the gauge plate and the knife and opening to the space between the gauge plate edge and the cutting edge of the knife, means closing the top of the housing, said housing having a steam jacket extending partially therearound and having communication with the interior of the housing, said housing having an open front, a hinged door closing said front, and a vertical partition wall carried by the door and dividing the interior of the housing into two meat receiving chambers, comprising vertically pivoted meat retaining hooks and vertically movable meat feeding plates.

6. In combination, a mechanical meat slicer comprising a frame having thereon a gauge plate having an edge and a knife having a cutting edge spaced from the gauge plate edge, an open bottom imperforate walled housing supported on the frame over the gauge plate and the knife and opening to the space between the gauge plate edge and the cutting edge of the knife, means closing the top of the housing, said housing having a steam jacket extending partially therearound and having communication with the interior of the housing, said housing having an open front, a hinged door closing said front, and a vertical partition wall carried by the door and dividing the interior of the housing into two meat receiving chambers, a meat retaining hook for each chamber vertically pivoted on the door to swing toward and away from pieces of meat present in the chambers, spring means acting between the housing and the hooks for elevating a selected hook engaged with a piece of meat, out of contact with the gauge plate and the knife, and operating means for each hook for depressing the hooks individually against the resistance of the spring means and for rotating the hooks individually between meat-engaging and retracted positions, said spring means serving to hold the hooks in meat-engaging positions upon release of the operating means.

7. In combination, a mechanical meat slicer comprising a frame having thereon a gauge plate having an edge and a knife having a cutting edge spaced from the gauge plate edge, an open bottom imperforate walled housing supported on the frame over the gauge plate and the knife and opening to the space between the gauge plate edge and the cutting edge of the knife, means closing the top of the housing, said housing having a steam jacket extending partially therearound and having communication with the interior of the housing, said housing having an open front, a hinged door closing said front, and a vertical partition wall carried by the door and dividing the interior of the housing into two meat receiving chambers, comprising vertically pivoted meat retaining hooks and vertically movable meat feeding plates, said feeding plates being located in the chambers above the hooks for engaging the tops of pieces of meat present in the chambers and depressing the pieces into the gauge plate and the knife, and means for elevating and depressing the plates.

8. In combination, a mechanical meat slicer comprising a frame having thereon a gauge plate having an edge and a knife having a cutting edge spaced from the gauge plate edge, an open bottom imperforate walled housing supported on the frame over the gauge plate and the knife and opening to the space between the gauge plate edge and the cutting edge of the knife, means closing the top of the housing, said housing having a steam jacket extending partially therearound and having communication with the interior of the housing, said housing having an open front, a hinged door closing said front, and a vertical partition wall carried by the door and dividing the interior of the housing into two meat receiving chambers, comprising vertically pivoted meat retaining hooks and vertically movable meat feeding plates, said feeding plates being located in the chambers above the hooks for engaging the tops of pieces of meat present in the chambers and depressing the pieces onto the gauge plate and the knife, and means for elevating and depressing the plates, and rotating the plates inwardly from normal positions along the side walls of the housing.

9. In combination, a mechanical meat slicer comprising a frame having thereon a gauge plate having an edge and a knife having a cutting edge spaced from the gauge plate edge, an open bottom imperforate walled housing supported on the frame over the gauge plate and the knife and opening to the space between the gauge plate edge and the cutting edge of the knife, means closing the top of the housing, said housing having a steam jacket extending partially therearound and having communication with the interior of the housing, said housing having an open front, a hinged door closing said front, and a vertical partition wall carried by the door and dividing the interior of the housing into two meat receiving chambers, comprising vertically pivoted meat retaining hooks and vertically movable meat feeding plates, said feeding plates being located in the chambers above the hooks for engaging the tops of pieces of meat present in the chambers and depressing the pieces onto the gauge plate and the knife, and means for elevating and depressing the plates, and rotating the plates inwardly from normal positions along the side walls of the housing, vertically slidable vertical rods journaled on the inner side of the door on which the hooks are fixed, said rods extending upwardly through said closing means and having handles on their upper ends.

10. In combination, a mechanical meat slicer comprising a frame having thereon a gauge plate having an edge and a knife having a cutting edge spaced from the gauge plate edge, an open bottom imperforate walled housing supported on the frame over the gauge plate and the knife and opening to the space between the gauge plate edge and the cutting edge of the knife, means closing the top of the housing, said housing having a steam jacket extending partially therearound and having communication with the interior of the housing, said housing having an open front, a hinged door closing said front, and a vertical partition wall carried by the door and dividing the interior of the housing into two meat receiving chambers, comprising vertically pivoted meat retaining hooks and vertically movable meat feeding plates, said feeding plates being located in the chambers above the hooks for engaging the tops of pieces of meat present in the chambers and depressing the pieces onto the gauge plate and the knife, and means for elevating and depressing the plates, stationary vertical rods mounted on the housing side walls, said meat feeding plates being slidably mounted on said rods, said elevating and depressing means comprising vertically movable operating rods journaled on the housing side walls and having portions engageable with the plates.

11. In combination, a mechanical meat slicer comprising a frame having thereon a gauge plate having an edge and a knife having a cutting edge spaced from the gauge plate edge, an open bottom imperforate walled housing supported on the frame over the gauge plate and the knife and opening to the space between the gauge plate edge and the cutting edge of the knife, means closing the top of the housing, said housing having a steam jacket extending partially therearound and having communication with the interior of the housing, said housing side walls being in forwardly divergent relationship, said jacket extending along the side walls and having an apex portion, said jacket having an inner wall spaced from the side walls, a perforated shield bridging said apex portion and connected to said inner wall, a vertical perforated steam manifold extending spacedly within the shield, electrical water heating means mounted within the jacket, and manual cut-off valve means controlling communication of steam between the shield and the jacket.

12. In combination, a mechanical meat slicer comprising a frame having thereon a gauge plate having an edge and a knife having a cutting edge spaced from the gauge plate edge, an open bottom imperforate walled housing supported on the frame over the gauge plate and the knife and opening to the space between the gauge plate edge and the cutting edge of the knife, means closing the top of the housing, said housing having a steam jacket extending partially therearound and having communication with the interior of the housing, said closing means comprising a top wall fixed on the upper end of the door and having edges normally in sealing engagement with the side walls of the housing.

13. A heating and moisturizing device for a meat slicer having a frame comprising a gauge plate and a knife having a cutting edge spaced from a part of the gauge plate; said device comprising a housing having divergent side walls, an open front closed by a door hinged on one of the side walls, said housing having an open top, a top wall fixed on the door and having edges normally sealingly engaged with the side walls at the top of the housing, said housing having a bottom opening registered with the space between the said part of the gauge plate and the cutting edge of the knife, and means movably mounting the housing on the slicer frame for transit across the gauge plate and the knife.

14. A heating and moisturizing device for a meat slicer having a frame comprising a gauge plate and a knife having a cutting edge spaced from a part of the gauge plate; said device comprising a housing having divergent side walls, an open front closed by a door hinged on one of the side walls, said housing having an open top, a top wall fixed on the door and having edges normally sealingly engaged with the sidewalls at the top of the housing, said housing having a bottom opening registered with the space between the said part of the gauge plate and the cutting edge of the knife, and means movably mounting the housing on the slicer frame for transit across the gauge plate and the knife, said door carrying a centered vertical partition wall serving to divide the interior of the housing into two meat chambers while the door is closed.

15. A heating and moisturizing device for a meat slicer having a frame comprising a gauge plate and a knife having a cutting edge spaced from a part of the gauge plate; said device comprising a housing having divergent side walls, an open front closed by a door hinged on one of the side walls, said housing having an open top, a top wall fixed on the door and having edges normally sealingly engaged with the side walls at the top of the housing, said housing having a bottom opening registered with the space between the said part of the gauge plate and the cutting edge of the knife, and means movably mounting the housing on the slicer frame for transit across the gauge plate and the knife, a V-shaped steam jacket having portions extending along and secured to the housing side walls at the inner sides thereof, means providing communication between the interior of the jacket and the interior of the housing at the meeting of said side walls, and an electrical heating element mounted within the jacket.

References Cited in the file of this patent

UNITED STATES PATENTS

| | | |
|---|---|---|
| 1,290,734 | Goodhue | Jan. 7, 1919 |
| 1,878,070 | Van Berkel | Sept. 20, 1932 |
| 2,112,443 | Martoccio | Mar. 29, 1938 |
| 2,208,651 | Wallace | July 23, 1940 |
| 2,235,509 | Waage | Mar. 18, 1941 |
| 2,275,524 | Gronich | Mar. 10, 1942 |
| 2,436,201 | Cole | Feb. 17, 1948 |
| 2,528,888 | Klingens | Nov. 7, 1950 |
| 2,804,009 | Holland | Aug. 27, 1957 |

FOREIGN PATENTS

| | | |
|---|---|---|
| 609,269 | Great Britain | Sept. 28, 1948 |